US006680142B2

(12) United States Patent
Singh et al.

(10) Patent No.: US 6,680,142 B2
(45) Date of Patent: Jan. 20, 2004

(54) BIO-BASED MICROBATTERY AND METHODS FOR FABRICATION OF SAME

(75) Inventors: Alok Singh, Springfield, VA (US); Ivan Stanish, Alexandria, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 213 days.

(21) Appl. No.: 09/939,288

(22) Filed: Aug. 24, 2001

(65) Prior Publication Data

US 2003/0039885 A1 Feb. 27, 2003

(51) Int. Cl.[7] .......................... H01M 4/60; H01M 4/66; H01M 2/16; H01M 2/18
(52) U.S. Cl. ...................... 429/213; 429/245; 429/255; 429/140
(58) Field of Search .......................... 429/2, 212, 213, 429/245, 255, 26, 140; 427/58

(56) References Cited

U.S. PATENT DOCUMENTS 6,120,751 A * 9/2000 Unger ........................ 424/9.51

FOREIGN PATENT DOCUMENTS

JP          10-280182     * 10/1998

OTHER PUBLICATIONS

Singh, Markowitz, Chow, Materials Fabrication Via Polymerizable Self-Organized Membranes, Nanostructured Materials, vol. 5, No. 2, pp. 141–153, 1995.
Stora, Dienes, Vogel, Duschl, Histidine-Tagged Amphiphiles for the Reversible Formation of Lipid Bilayer, Aggregates . . . , Langmuir, 2000, 16, 5471–5478.
Singh, Schoen, Boudeville, Temperature Dependent Membrane Phase Reorganization In Giant Vesicles, Chemistry and Physics of Lipids, 94 (1998) 53–61.
Laughlin, Equilibrium Vesicles: Fact or Fiction?, Colloids and Surfaces, 128, (1997) 27–38.
Kumaran, Spontaneous formation of vesicles by weakly charged membranes, J. Chem. Phys. 99 (7) Oct. 1, 1993, 5490–5499.
Dubois, Zegarski, Nuzzo, Molecular ordering of organosulfur compounds on Au(111) and Au(100): Adsorption from solution and in ultrahigh vacuum, J. Chem. Phys., 98 (1), Jan. 1, 1993, 678–688.
Leatherman, Durantini, Gust, Moore, Moore, Stone, Zhou, Rez, Liu, Lindsay, Carotene as a Molecular Wire: Conducting Atomic Force Microscopy, J. Phys. Chem. B. 1999, 103, 4006–4010.
Powers, Batteries for Low Power Electronics, Proceedings of the IEEE, vol. 83, No. 4, Apr. 1995, p687–693.

(List continued on next page.)

*Primary Examiner*—Patrick Ryan
*Assistant Examiner*—Thomas H. Parsons
(74) *Attorney, Agent, or Firm*—John J. Karasek; Rebecca L. Foreman

(57) ABSTRACT

The invention relates to a microbattery made of bioelectroactive components based on biomimetic processes. Bioderived electron donors and electron acceptors are separately encapsulated in at least one pair of polymerized phospholipid vesicles. Embedded within the vesicle walls are lipophilic electron mediators that facilitate the transfer of electrons across the vesicle walls. Each pair of vesicles is immobilized on a conducting surface. The pair of vesicles are isolated from each other to create a galvanic cell, in which electrons flow from high to low electrochemical potential. A high energy density battery can be achieved if the vesicles are immobilized on highly porous conducting substrates.

59 Claims, 2 Drawing Sheets

OTHER PUBLICATIONS

Mansouri, Burford, Characterization of PVDF–PPy composite membranes, Polymer, vol. 38, No. 24, pp. 6055–6069.

Sakai, Uehara, Ishikawa, R&D on metal hydride materials and Ni–MH batteries in Japan, Alloys and Compounds, 293–295 (1999) 762–769.

Shokoohi, Tarascon, Wilkens, Fabrication of thin–film $LiMn_2O_4$ cathodes for recharageable microbatteries, Appl. Phys. Lett. 59 (10) Sep. 2, 1991, pp. 1260–1262.

Zhou, Bio–inspired study of structural materials, Materials Science and Engineering C 11 (2000) 13–18.

* cited by examiner

BIO-BASED MICROBATTERY AND METHODS FOR FABRICATION OF SAME

FIELD OF THE INVENTION

The present invention relates generally to microbatteries and methods for making same, more specifically to bio-based microbatteries and methods for making same.

BACKGROUND

Throughout the present specification, all referenced papers and patents are incorporated herein by reference for all purposes.

The present invention provides for materials and methods to battery design by exploiting highly efficient modes of energy transduction and storage found in natural systems, which aims to optimize and maximize system performance in relation to energetic, economic, ergonomic, and environmental aspects. A battery is an assembly of more than one galvanic cell, which converts chemical energy into electrical energy. The first galvanic cell composed of frog muscle was observed by Luigi Galvani in 1762. It was not until 1800 that Allessandro Volta understood and officially documented the electrochemical operation of galvanic cells. By 1859, Geoerges Leclanche developed the first primary (disposable) battery based on the zinc/carbon cell. Surprisingly, these cells are still used world-wide. Development of primary alkaline batteries was a natural progression from the zinc/carbon cell, and by 1866, Gaston Plante produced the secondary (rechargeable) lead/acid battery. In 1899, W. Junger developed the nickel/cadmium battery and in the $20^{th}$ century, nickel/metal-hydride, lithium, lithium-ion, zinc/air, mercury and silver based batteries emerged and variations thereof to enhance energy densities on a per weight and volume basis. Nowadays, numerous types of battery designs have been commercialized, resulting from an application-based niche, dependent on size, power, energy, convenience, and marketability. Unfortunately, batteries suffer from one or more of the following traits: toxicity, flammablity, explosivity, low energy density, low discharge rate, instability, expensive material use, high fabrication costs, short cycle life, production complexity, and excessive design precautions.

With regards to environmental issues, 85% of the mercury (a highly toxic metal) found in New York's solid waste in 1996 was attributed to mercury batteries and in 1991, household batteries measured by weight were the second most common source of toxins in U.S. landfills. The need to curb battery toxicity on the environment led to congressional action, such as enacting The Battery Act of 1996 to phase out the use of mercury in batteries and the Implementation of the Mercury-Containing and Rechargeable Battery Management Act of 1997 to provide for the efficient and cost-effective collection, recycling, and disposal of used nickel-cadmium batteries, small sealed lead-acid batteries, and other batteries deemed toxic under the purview of this act. Therefore, the present invention is composed of materials and engineered to significantly reduce device toxicity as opposed to those observed with conventional batteries.

With regards to system size, the present invention is intended to deliver power locally for nanoscopic, mesoscopic, and microscopic devices where conventional technologies falter. For instance, conventional computer circuitries employ transformers for stepping-down currents and voltages in order to prevent power overload of the smaller, local electronic units. The ability to do away with excess transformers will obviously conserve system (i.e., battery) space and weight. Furthermore, due to the environmentally benign material composition of the present invention, disposal of these miniaturized batteries will not require elaborate monitoring or processing of hazardous waste. The present invention with such small dimensions fulfills issues of convenience and allows for the construction of less conspicuous devices.

OBJECTS OF THE INVENTION

Accordingly, it is a purpose of the present invention to provide a microbattery that can provide energy densities comparable to conventional batteries, while avoiding the use of hazardous and toxic materials.

It is another object of the present invention to provide an energy source that relies on renewable resources It is another object of the present invention to provide materials and methods to decrease microbattery processing, production, and disposal costs.

It is another object of the present invention to provide a method for microbattery design with easily tunable currents and voltages.

It is another object of the present invention to provide a method for primary (non-rechargeable/disposable) and secondary (rechargeable) microbattery design.

It is a further object of the present invention to provide methods for making a microbattery that can provide energy densities comparable to conventional batteries, while avoiding the use of hazardous and toxic materials.

SUMMARY OF THE INVENTION

These and additional objects of the invention are accomplished by providing a bio-based microbattery and methods of making same.

These and additional objects of the invention are accomplished by immobilizing polymerized vesicles encapsulating electroactive species of differing redox potentials to a conducting substrate. The polymerized vesicle is comprised of chemically and physically stable polymerizable phospholipids or suitable vesicle forming amphiphiles. The vesicle walls may or may not incorporate a liphophilic electron mediator that facilitates the transport of electrons across a vesicle bilayer.

These and additional objects of the invention are further accomplished by providing a galvanic cell comprising an electron acceptor and an electron donor, each being separately encapsulated in polymerized vesicles, wherein the vesicle walls may or may not incorporate an electron mediator and the vesicles are separately immobilized to a conducting substrate and isolated from each other.

These and additional objects of the invention are further accomplished by providing a microbattery comprised of at least one galvanic cell fabricated on or within a conducting substrate.

These and additional objects of the invention are further accomplished by providing a method of immobilizing a polymerized vesicle to a conducting substrate by providing an electroactive polymerized vesicle, a conducting substrate, and a functionalized tether to immobilize the vesicle to the substrate.

These and additional objects are further accomplished by providing an electrode comprising a polymerized vesicle encapsulating an electroactive species, where the vesicle is immobilized by a functionalized tether to a conducting substrate.

These and additional objects are further accomplished by providing a galvanic cell comprising a first electrode as above encapsulating cathodic electroactive activity, a second electrode as above encapsulating anodic electroactive activity, with the first and second electrode being separately immobilized to a conducting substrate, and being physically isolated from each other but having controlled and directed electrical communication between electrodes, wherein a load is connected between the first and said second electrode.

These and additional objects are further accomplished by providing a microbattery comprising at least two galvanic cells as above connected in series or parallel.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION

Figure 1:
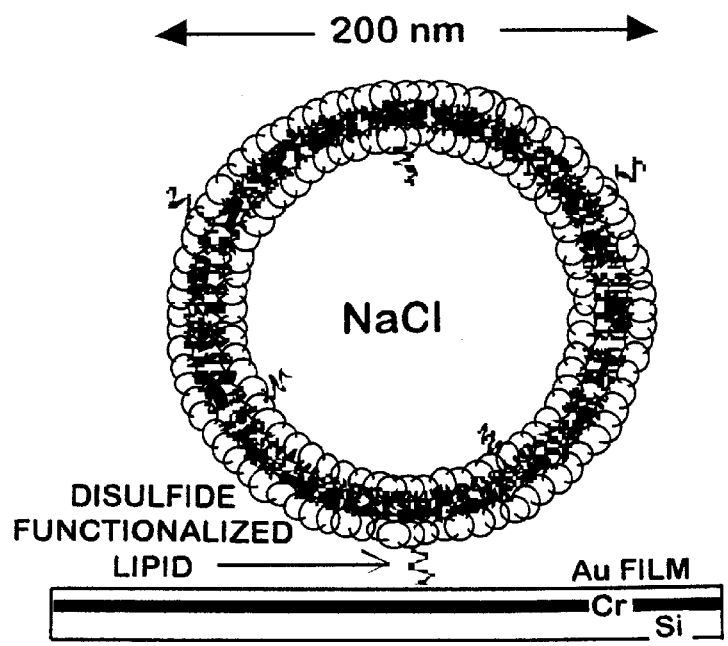
FIG. 1 is a schematic depiction, not to scale, of a unilamellar, polymerized vesicle immobilized to a conducting substrate.
Figure 2:
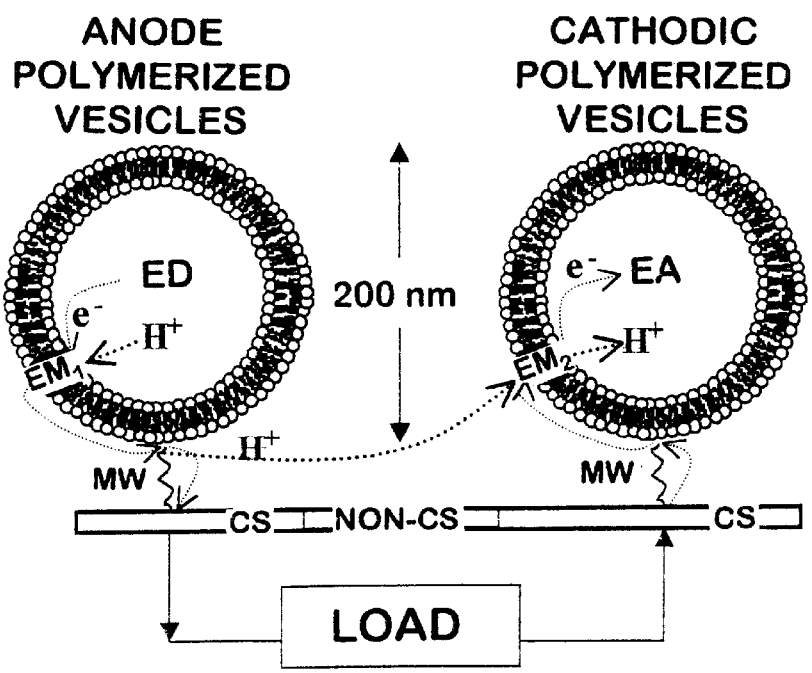
FIG. 2 is a schematic, not to scale, depiction of the bio-based microbattery.

The objective of the present invention describes materials and methods to increase the power/energy content of present-day batteries through efficient use of space and conversion of energy, while eliminating system toxicity. The novel bioelectrochemical architecture of this system builds from the molecular and supramolecular scale, exploiting tools from the fields of nano- and colloidal science. The key element that determines battery performance can be pinpointed to the electrode. Electrode design and the available fabrication technology will determine the extent of its efficiency, stability, energy-content, and toxicity. A design schematic of the present invention is depicted in FIG. 2, represented as a galvanic cell. The system electrode is divided into three components: a conducting thin film (i.e., 25 nm Au) that can range from 0.5–100 nm, a molecular wire, and stable, electroactive phospholipid vesicles. At the cathode, chemisorbed polymerized phospholipid vesicles contain an electron acceptor typically at submolar levels, but with the aim of reaching 1 M and higher. At the anode, chemisorbed polymerized phospholipid vesicles contain an electron donor at a concentration with electron equivalents close to that of the electron acceptor. Since these vesicles are impervious to water-soluble reductants/oxidants, electrons and hydrogen ions rapidly cross the vesicle membrane (that range in thickness from 1–20 nm) via a lipophilic electron mediator. Electrons then travel through a molecular wire, which anchors the vesicle to the surface, and subsequently shunted through a load to perform work as they flow from the anode to the cathode.

Figure 3:
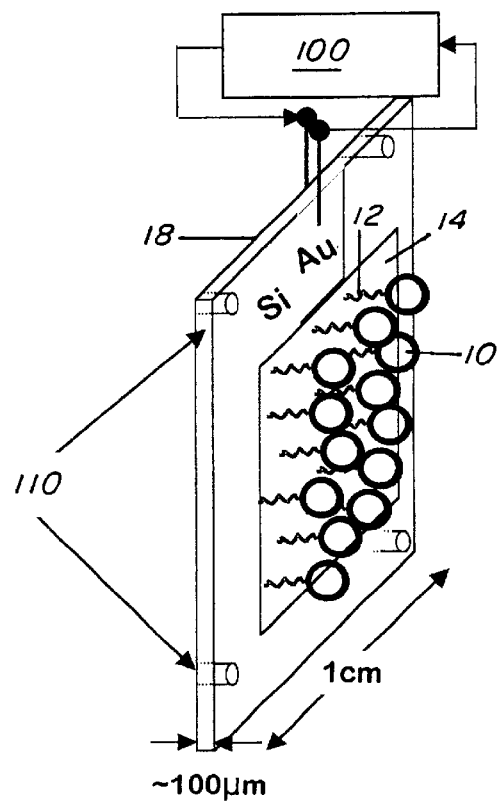
FIG. 3 is a schematic, not to scale, depiction of a bio-based submicron galvanic cell using a conductive thin film coated glass substrate.

FIG. 3 is a schematic, not to scale representation of a bio-based submicron galvanic cell. Vesicles 10, encapsulating electroactive species of differing redox potential, are immobilized via thiolate linkage 12 on a conducting gold substrate 14 that has been selectively electrodeposited on both sides of a glass slide 18. Electrons flow through a load 100 from high to low reduction potential. Openings 110 allow for $H^+$ flow in order to maintain electrical neutrality. Thousands of these vesicle-based galvanic plates could be connected in parallel or in series to produce miniature high charge capacity or high current battery devices.

Figure 4:
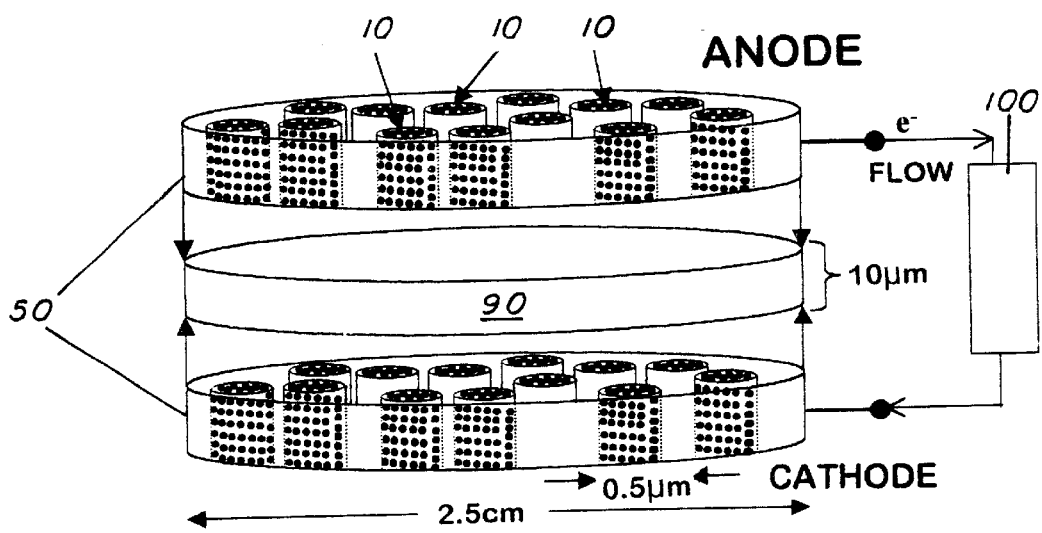
FIG. 4 is a schematic, not to scale, depiction of a bio-based submicron galvanic cell using a porous conducting polymer substrate.

FIG. 4 shows a schematic, not to scale, bio-based microbattery using a porous conducting polymer substrate 50. Vesicles 10 are immobilized on the porous conducting polymer substrate 50. The vesicles 10, encasing electroactive species of differing redox potentials, are separately immobilized on a pair of porous conducting substrates 50. A semipermeable insulator 90 which may or may not be necessary separates the porous conducting substrates 50. The electrons flow through a load 100 from high to low potential. The porous conducting polymer substrates provide for a greater exposed surface area, increased flexibility, reduced system weight, and increased specific energy density. Thousands of these vesicle-based galvanic plates could be connected in parallel or in series to produce miniature high charge capacity or high current battery devices.

The present application describes a method of immobilizing a polymerized vesicle to a conducting substrate by allowing a suspension of polymerized vesicles to contact the conducting substrate in the presence of a functionalized tether to attach the vesicles to the substrate.

The conducting substrate can be a metal, polymer, or alloy. Specifically, the conducting substrate can be gold, silver, palladium, platinum, rhodium, tin, polypyrrole, polyaniline, or indium titanium oxide.

The polymerized vesicle is can be comprised of phospholipids, quartenary amine surfactants, or other suitable vesicle forming amphiphiles. Specifically, the polymerized vesicle is can be made from phospholipids having an ether, ester, or amide-linked backbone. The phospholipids can further include a polymerizable functionality such as a vinyl, acetylenic, methacryl, acryl, styrl, diacetylenic, sulfhydrl, disulfide, dienoates, which can be located in the head group, tail, or interfacial region.

Further, the polymerized vesicle may encapsulate an organic or inorganic electron donor or electron acceptor species, becoming an electroactive polymerized vesicle. Examples of electron donor species are riboflavin, ascorbic acid, and ferricyanide. Examples of electron acceptor species are ferricyanide, superferrioxide, or ferri chelates with combined with either glutamate, ethylenediamine tetraacetic acid, or citrates, and manganese chelates combined with either glutamate, ethylenediamine tetraacetic acid, or citrates.

The electroactive polymerized vesicle optionally includes organic concomitant electron and proton mediators such as benzoquinone, vitamin K, and ubiquinone. Alternatively, the electroactive polymerized vesicle optionally include organic electron mediators or channels, such as ferrocene and caroviolegen. Alternatively, the electroactive polymerized vesicle may optionally include organic cationic carriers or channels such as nigericin, monenesin, gramicidin, lasalocid, calcimycin, and ionomycin.

The functionalized tether is can be comprised of a saturated aliphatic, such as ethyl, propyl, butyl, pentyl, and hexyl. Alternatively, the functionalized tether can be comprised of a conjugated or non-conjugated polyene, polyacetylene, or polyphenylacetylene. The tether may be conducting or nonconducting, and optionally include a terminal functional group for non-covalent or covalent substrate binding, such as sulfhydryl, disulfide, and amide.

The functionalized tether may be linked covalently to the vesicle during vesicle synthesis. Alternatively, the functionalized tether is linked covalently to the vesicle subsequent to vesicle synthesis. The functionalized tether may be linked non-covalently or covalently to the conducting substrate.

The present application further provides for an electrode, comprised of an electroactive polymerized vesicle, optionally incorporating an electron mediator or channel in the vesicle walls, and being immobilized by functionalized tether to a conducting substrate. The electrode can comprise an electron mediator or channel, which may be benzoquinone, vitamin K, or ubiquinone. The substrate may be gold.

A galvanic cell can be made using the electrodes of the present invention by attaching at least two of the above electrodes to a conductive substrate where the first electrode encapsulates cathodic electroactive activity and the second electrode encapsulating anodic electroactive activity. The electrodes are separately immobilized to the conducting substrate and electrically isolated from each other, and electrons flow through a load from high to low reduction potential.

The microbattery of the present application is made by connecting at least two of the galvanic cells, either in series or in parallel.

Although a potential of 1.23 V is the thermodynamic limit obtainable for aqueous systems, this value can be increased under basic conditions. Back of the envelope calculations show that a 1 L system housed in a highly porous conductive media, can reach charge capacities of ~500 A-hr for entrapment of a three electron equivalent specie at 6 M. With this system, the specific energy achieved theoretically for one cycle can reach ~369 W-hr, which competes effectively with today's leading market batteries. The present invention makes efficient use of space, energy conversion (i.e., low ohmic loss and low concentration polarization effects), and provides for an alternative approach with respect to design and synthesis of environmentally safe batteries.

EXAMPLES

Having described the invention, the following examples are given to illustrate specific applications of the invention, including the best mode now known to perform the invention. These specific examples are not intended to limit the scope of the invention described in this application.

Example 1a
Vesicle Formation
25 mg of 1,2-bis(tricosa-10,12-diynoyl)-sn-3-glycerophosphocholine ($DC_{8,9}PC$) is placed in a scintillation vial and dispersed with 5 mL of deionized water. The sample is vortexed for 1 minute, heated to 50° C. for 2 hours, and subsequently extruded 10 times through 0.2 $\mu$m Nucleopore membranes using a Lipex extruder (Lipex Biomembranes Inc., Vancouver BC). The sample was UV-irradiated for 10 minutes at 8° C. using a Rayonett Photochemical reactor (So. New England Ultraviolet Co., Hamden, Conn.). Polymerized vesicle average size (~200 nm), shape (spherical), and lamellarity (uni-) were determined by dynamic laser light scattering using a Coulter Model N4MD (Coulter Electronic, In., Miami, Fla.) and/or by a Zeiss transmission electron microscopy (TEM) or by a 8100 Hitachi high resolution TEM.

Example 1b
25 mg of 1-palmitoyl-2-(tricosa-10,12-diynoyl)-sn-glycero-3-phosphocholine ($PC_{8,9}PC$) is placed in a scintillation vial and dispersed with 5 mL of deionized water. The sample is vortexed for 1 minute, heated to 50° C. for 2 hours and subsequently extruded 10 times through 0.2 $\mu$m Nucleopore membranes using a Lipex extruder (Lipex Biomembranes Inc., Vancouver BC). The sample was UV-irradiated for 10 minutes at 8° C. using a Rayonett Photochemical reactor (So. New England Ultraviolet Co., Hamden, Conn.). Polymerized vesicle average size (~200 nm), shape (spherical), and lamellarity (uni-) were determined by dynamic laser light scattering using a Coulter Model N4MD (Coulter Electronic, In., Miami, Fla.) and/or by a Zeiss transmission electron microscopy (TEM) or by a 8100 Hitachi high resolution TEM.

Example 1c
25 mg of 1,2-bis(trideca-12-ynoyl)-sn-glycero-3-phosphocholine ($DC_{10}PC$) is placed in a scintillation vial and dispersed with 5 mL of deuterated water. The sample is vortexed for 1 minute, heated to 50° C. for 2 hours, and subsequently extruded 10 times through 0.2 $\mu$m Nucleopore membranes using a Lipex extruder (Lipex Biomembranes Inc., Vancouver BC). The sample was exposed to 10 megaradians of $\gamma$-radiation using a $^{60}Co$ source. Polymerized vesicle average size (~130 nm), shape (spherical), and lamellarity (uni-) were determined by dynamic laser light scattering using a Coulter Model N4MD (Coulter Electronic, In., Miami, Fla.) and/or by a Zeiss transmission electron microscopy (TEM) or by a 8100 Hitachi high resolution TEM.

Example 2
Functionalized Vesicle Formation
25 mg of 1,2-bis(tricosa-10,12-diynoyl)-sn-3-glycerophosphocholine ($DC_{8,9}PC$) dissolved in chloroform and 0.26 mL of 1,2-bis(tricosa-10,12-diynoyl)-sn-3-glycerophospho-2-[(2-hydroxyethyl) disulfanyl)] ethanol ($DC_{8,9}PDSEtOH$) dissolved in chloroform at 1 mg/mL were placed in a round bottom flask, dried, and re-dispersed in 5 mL of deionized water. The sample is vortexed for 1 minute, heated to 50° C. for 2 hours, and subsequently extruded 10 times through 0.2 $\mu$m Nucleopore membranes using a Lipex extruder (Lipex Biomembranes Inc., Vancouver BC). The sample was UV-irradiated for 10 minutes at 8° C. using a Rayonett Photochemical reactor (So. New England Ultraviolet Co., Hamden, Conn.). Polymerized vesicle average size (~200 nm), shape (spherical), and lamellarity (uni-) were determined by dynamic laser light scattering using a Coulter Model N4MD (Coulter Electronic, In., Miami, Fla.) and/or by a Zeiss transmission electron microscopy (TEM) or by a 8100 Hitachi high resolution TEM.

Example 3a
Attachment of Functionalized Polymerized Vesicles to Conducting Substrate
Glass substrates coated with gold films were allowed to incubate at room temperature for at least one hour in a suspension of disulfide-functionalized, polymerized vesicles (refer to Example 2), and the vesicle films were characterized by in situ atomic force microscopy (AFM). Relative to bare gold surfaces, polymerized vesicles chemisorbed onto gold films present a surface roughness of 83 nm and a depth height determined by scribing of 181 nm (i.e., congruent to the vesicle diameter). Gold thin film was deposited using an Edwards Auto306 thermal evaporator (Edwards High Vacuum, West Sussex, UK) onto a clean pre-cut 1 $cm^2$ glass slide affixed with epoxy onto a 1.2 cm stainless steel disk. A 15 nm precursor film of chromium metal was deposited onto the glass slide for subsequent binding of a 25 nm gold film. AFM scans were acquired in contact mode using an Explorer AFM (Topometrix, Sunnyvale, Calif.).

Example 3b

Polymerized vesicles immobilized onto gold films (refer to Example 3a) were imaged in situ using environmental scanning electron microscopy (ESEM) using a 20 keV electron source beam and an environmental secondary electron detector with the sample chamber temperature and pressure established at 23° C. and 4.4 torr, respectively. Vesicle size (~200 nm) and shape (spherical) are retained when exposed to a smooth gold surface as apparent visually.

Example 4
Polymerized Vesicle Retention of Electroactive Material 100 mg of 1-palmitoyl-2-(tricosa-10,12-diynoyl)-sn-glycero-3-phosphocholine ($PC_{8,9}PC$) is placed in a scintillation vial and dispersed with 5 mL of 0.1 M potassium ferricyanide ($K_3Fe(CN)_6$). The sample is vortexed for 1 minute, heated to 50° C. for 2 hours, and subsequently extruded 10 times through 0.2 $\mu$m Nucleopore membranes using a Lipex extruder (Lipex Biomembranes Inc., Vancouver BC). Extravesicular ferricyanide was removed by anion exchange chromatography using amberlite IRA (Sigma Chemical Co.) with 0.1 M sodium chloride (NaCl) as the mobile phase. After cooling to 7° C., the sample was UV-irradiated for 15 minutes using a Rayonett Photochemical reactor (So. New England Ultraviolet Co., Hamden, Conn.). Polymerized vesicle average size (~200 nm), shape (spherical), and lamellarity (uni-) were determined by dynamic laser light scattering using a Coulter Model N4MD (Coulter Electronic, Inc., Miami. Fla.) and/or by a Zeiss transmission electron microscopy (TEM) or by a 8100 Hitachi high resolution TEM. These vesicles retain and isolate entrapped ferricyanide under electrochemically stressful conditions. An applied potential in excess of several hundred millivolts beyond the formal reduction/oxidation (redox) potential of ferricyanide did not produce any signal (i.e., current), unless the vesicles were disrupted by addition of 200 mg n-octyl-$\beta$-D-glucopyranoside (OG, Biosynth A.-G., Switzerland) thereby releasing entrapped ferricyanide. Electrochemical measurements were performed with a CV-50 W voltammetric analyzer (Bioanalytical Systems) using a clean bare gold electrode, a Pt-coated Nb wire, and a Ag/AgCl, saturated KCl electrode as the working, counter, and reference electrodes, respectively. The experimental sample consisted of a 2 mL dispersion of polymerized vesicles and aqueous buffer (10 mM sodium hydrogen phosphate and 100 mM (NaCl) at pH 7 and 25° C. Note that the aqueous buffer is not electroactive under the aforementioned experimental conditions.

Example 5
Electron Transport Across Polymerized Vesicle Membranes 0.5 mL of polymerized vesicles encapsulating 0.1 $K_3Fe(CN)_6$ (refer to Example 4) and 2.5 mL of aqueous buffer (refer to Example 4) were mixed in a 4 mL quartz cuvette in addition to having 32 $\mu$M benzoquinine and 2.3 $\mu$M monensin, and 166 $\mu$M ascorbic acid on a total reservoir volume basis. Electron reduction dynamics was monitored spectrophotometrically at 420 nm at pH 7, 25° C., and 1 atm using a UV-Visible Cary 4G spectrophotometer. For this sample, the initial electron transport rate and charge capacity was 0.26 $\mu$M/s and 0.4 $\mu$mols, respectively.

Obviously, many modifications and variations of the present invention are possible in light of the above teachings. It is therefore to be understood that, within the scope of the appended claims, the invention may be practiced otherwise than as specifically described.

What is claimed is:

1. A method of immobilizing electroactive polymerized vesicles to a conducting substrate comprising:
   providing a suspension of electroactive polymerized vesicles;
   providing a conducting substrate;
   providing a functionalized tether; and
   allowing the suspension of electroactive polymerized vesicles to contact the conducting substrate in the presence of the functionalized tether to attach the vesicles to the substrate.

2. The method of claim 1 wherein the conducting substrate is selected from the group consisting of metal, polymer, and alloy.

3. The method of claim 2 wherein the conducting substrate is selected from the group consisting of gold, silver, palladium, platinum, rhodium, tin, polypyrrole, polyaniline, and indium titanium oxide.

4. The method of claim 1 wherein the polymerized vesicle is comprised of phospholipids, quartenary amine surfactants, or vesicle-forming amphiphiles.

5. The method of claim 1 wherein the polymerized vesicle is comprised of phospholipids having an ether, ester, or amide-linked backbone.

6. The method of claim 1 wherein the polymerized vesicle is comprised of phospholipids having polymerizable functionality.

7. The method of claim 6 wherein said polymerizable functionality is located in the head-group, tail, or interfacial region and is selected from the group consisting of vinyl, acetylenic, methacryl, acryl, styrl, diacetylenic, sulfhydrl, disulfide, and dienoates.

8. The method of claim 1 wherein the electroactive polymerized vesicle encapsulates an electron donor species.

9. The method of claim 8 wherein said electron donor species is organic or inorganic.

10. The method of claim 9 wherein said electron donor species is selected from the group consisting of riboflavin, ascorbic acid, and ferrocyanide.

11. The method of claim 1 wherein the electroactive polymerized vesicle encapsulates an electron acceptor.

12. The method of claim 11 wherein said electron acceptor is organic or inorganic.

13. The method of claim 12 wherein said electron acceptor is selected from the group consisting of ferricyanide, superferrioxide, ferri chelates combined with glutamate, ethylenediamine tetraacetic acid or citrate, and manganese chelates combined with glutamate, ethylenediamine tetraacetic acid or citrate.

14. The method of claim 1 wherein the polymerized vesicle further includes organic concomitant electron and proton mediators.

15. The method of claim 14 wherein said organic concomitant electron and proton mediators are selected from the group consisting of benzoquinone, vitamin K, and ubiquinone.

16. The method of claim 1 wherein the polymerized vesicle further includes organic electron mediators or channels.

17. The method of claim 16 wherein the organic electron mediators or channels are selected from the group consisting of ferrocene and caroviolegen.

18. The method of claim 1 wherein the polymerized vesicle is comprised of organic cationic carriers or channels.

19. The method of claim 18 wherein the organic cationic carriers or channels are selected from the group consisting of nigericin, monenesin, gramicidin, lasalocid, calcimycin, and ionomycin.

20. The method of claim 1 wherein the functionalized tether is comprised of a saturated aliphatic.

21. The method of claim 20 wherein the saturated aliphatic tether is selected from the group consisting of ethyl, propyl, butyl, pentyl, and hexyl.

22. The method of claim 1 wherein the functionalized tether is comprised of conjugated or non-conjugated polyene, polyacetylene, or polyphenylacetylene.

23. The method of claim 1 wherein the conducting or non-conducting tether further includes a terminal functional group for non-covalent or covalent substrate binding.

24. The method of claim 23 wherein said terminal functional group is selected from the group consisting of sulfhydryl, disulfide, and amide.

25. The method of claim 1 wherein the functionalized tether is linked covalently to the vesicle during vesicle synthesis.

26. The method of claim 1 wherein the functionalized tether is linked covalently to the vesicle subsequent to vesicle synthesis.

27. The method of claim 1 wherein the functionalized tether is linked non-covalently or covalently to the conducting substrate.

28. An electrode comprising:
one or more polymerized vesicles encapsulating one or more electroactive species, said vesicle having vesicle walls;
a conducting substrate; and
a functionalized tether, wherein said vesicle is immobilized by the functionalized tether to the conducting substrate.

29. The electrode of claim 28 wherein the conducting substrate is selected from the group consisting of metal, polymer, and alloy.

30. The electrode of claim 28 wherein the conducting substrate is selected from the group consisting of gold, silver, palladium, platinum, rhodium, tin, polypyrrole, polyaniline, and indium titanium oxide.

31. The electrode of claim 28 wherein the polymerized vesicle is comprised of phospholipids, quarternary amine surfactants, or vesicle-forming amphiphiles.

32. The electrode of claim 28 wherein the polymerized vesicle is comprised of phospholipids having an ether, ester, or amide-linked backbone.

33. The electrode of claim 28 wherein the polymerized vesicle is comprised of phospholipids having polymerizable functionality.

34. The electrode of claim 33 wherein said polymerizable functionality is located in the head-group, tail, or interfacial region and is selected from the group consisting of vinyl, acetylenic, methacryl, acryl, styrl, diacetylenic, sulfhydrl, disulfide, and dienoates.

35. The electrode of claim 28 wherein the electroactive polymerized vesicle encapsulates an electron donor species.

36. The electrode of claim 35 wherein said electron donor species is organic or inorganic.

37. The electrode of claim 35 wherein said electron donor species is selected from the group consisting of riboflavin, ascorbic acid, and ferrocyanide.

38. The electrode of claim 28 wherein the electroactive polymerized vesicle encapsulates an electron acceptor.

39. The electrode of claim 38 wherein said electron acceptor is organic or inorganic.

40. The electrode of claim 38 wherein said electron acceptor is selected from the group consisting of ferricyanide, superferrioxide, ferri chelates combined with glutamate, ethylenediamine tetraacetic acid or citrate, and manganese chelates, combined with glutamate, ethylenediamine tetraacetic acid or citrate.

41. The electrode of claim 28 wherein the polymerized vesicle further includes organic concomitant electron and proton mediators.

42. The electrode of claim 41 wherein said organic concomitant electron and proton mediators are selected from the group consisting of benzoquinone, vitamin K, and ubiquinone.

43. The electrode of claim 28 wherein the polymerized vesicle further includes organic electron mediators or channels.

44. The electrode of claim 43 wherein the organic electron mediators or channels are selected from the group consisting of ferrocene and caroviolegen.

45. The electrode of claim 28 wherein the polymerized vesicle further includes organic cationic carriers or channels.

46. The electrode of claim 45 wherein the organic cationic carriers or channels are selected from the group consisting of nigericin, monenesin, gramicidin, lasalocid, calcimycin, and ionomycin.

47. The electrode of claim 28 wherein the functionalized tether is comprised of a saturated aliphatic.

48. The electrode of claim 47 wherein the saturated aliphatic tether is selected from the group consisting of ethyl, propyl, butyl, pentyl, and hexyl.

49. The electrode of claim 28 wherein the functionalized tether is comprised of conjugated or non-conjugated polyene, polyacetylene, or polyphenylacetylene.

50. The electrode of claim 28 wherein the functionalized tether further includes a terminal functional group for non-covalent or covalent substrate binding.

51. The electrode of claim 50 wherein said terminal functional group is selected from the group consisting of sulfhydryl, disulfide, and amide.

52. The electrode of claim 28 wherein the functionalized tether is linked covalently to the vesicle during vesicle synthesis.

53. The electrode of claim 28 wherein the functionalized tether is linked covalently to the vesicle subsequent to vesicle synthesis.

54. The electrode of claim 28 wherein the functionalized tether is linked non-covalently or covalently to the conducting substrate.

55. The electrode of claim 28 wherein said conducting substrate is gold.

56. The electrode of claim 28 wherein the vesicle walls incorporate an electron mediator or channel.

57. The electrode of claim 56 wherein said electron mediator is selected from the group consisting of benzoquinone, vitamin K, and ubiquinone.

58. A galvanic cell comprising:
a first electrode as in claim 28 encapsulating cathodic electroactive activity;
a second electrode as in claim 28 encapsulating anodic electroactive activity;
said first electrode and said second electrode being separately immobilized to the conducting substrate and being electrically isolated from each other, wherein a load is connected between said first electrode and said second electrode.

59. A microbattery comprised of:
At least two galvanic cells as in claim 58, wherein said at least two galvanic cells are connected in series or in parallel.

* * * * *